(12) United States Patent  (10) Patent No.: US 8,434,597 B2
Joss et al.  (45) Date of Patent: May 7, 2013

(54) FITTING COVER

(75) Inventors: Michael S Joss, Chicago, IL (US); Tony Christer Kilian, Safety Way (AU); Michael Tony Kilian, Naperville, IL (US)

(73) Assignee: Fluid Defense Systems, LLC, Montgomery, IL (US)

( * ) Notice: Subject to any disclaimer, the term of this patent is extended or adjusted under 35 U.S.C. 154(b) by 816 days.

(21) Appl. No.: 12/332,342

(22) Filed: Dec. 11, 2008

(65) Prior Publication Data

US 2010/0147629 A1  Jun. 17, 2010

(51) Int. Cl.
*F16N 21/06* (2006.01)

(52) U.S. Cl.
USPC ...................................... 184/105.3

(58) Field of Classification Search .............. 184/105.3, 184/88.1, 45.1; 210/236, 469; 206/449
See application file for complete search history.

(56) References Cited

U.S. PATENT DOCUMENTS

| | | | | |
|---|---|---|---|---|
| 3,147,824 A | * | 9/1964 | Henderson | 184/88.1 |
| 3,971,458 A | * | 7/1976 | Koenig | 190/120 |
| 5,054,859 A | * | 10/1991 | Goettker | 301/108.1 |
| D337,656 S | * | 7/1993 | Hostert | D3/247 |
| 5,417,247 A | * | 5/1995 | Tarui et al. | 138/89.2 |
| 5,595,401 A | * | 1/1997 | Exline et al. | 281/2 |
| 5,900,307 A | * | 5/1999 | Barcikowski | 428/203 |
| 6,105,298 A | * | 8/2000 | Grayson et al. | 40/776 |
| D443,488 S | * | 6/2001 | Palladino | D8/14.1 |
| 6,349,794 B2 | * | 2/2002 | Spencer | 184/105.3 |
| 6,427,836 B1 | * | 8/2002 | Bolanos | 206/449 |
| 2008/0290121 A1 | * | 11/2008 | Wise et al. | 223/113 |
| 2011/0278216 A1 | * | 11/2011 | Hull et al. | 210/236 |

* cited by examiner

*Primary Examiner* — William E Dondero
*Assistant Examiner* — Robert T Reese
(74) *Attorney, Agent, or Firm* — Thompson Coburn LLP

(57) ABSTRACT

A lubricant fitting cover for a zerk having a substantially planar body with a first side and a second side, the first side is capable of being removeably secured to the head of a grease fitting, the second side includes an indicator for providing information about the type of lubricant to be injected through the grease fitting.

6 Claims, 6 Drawing Sheets

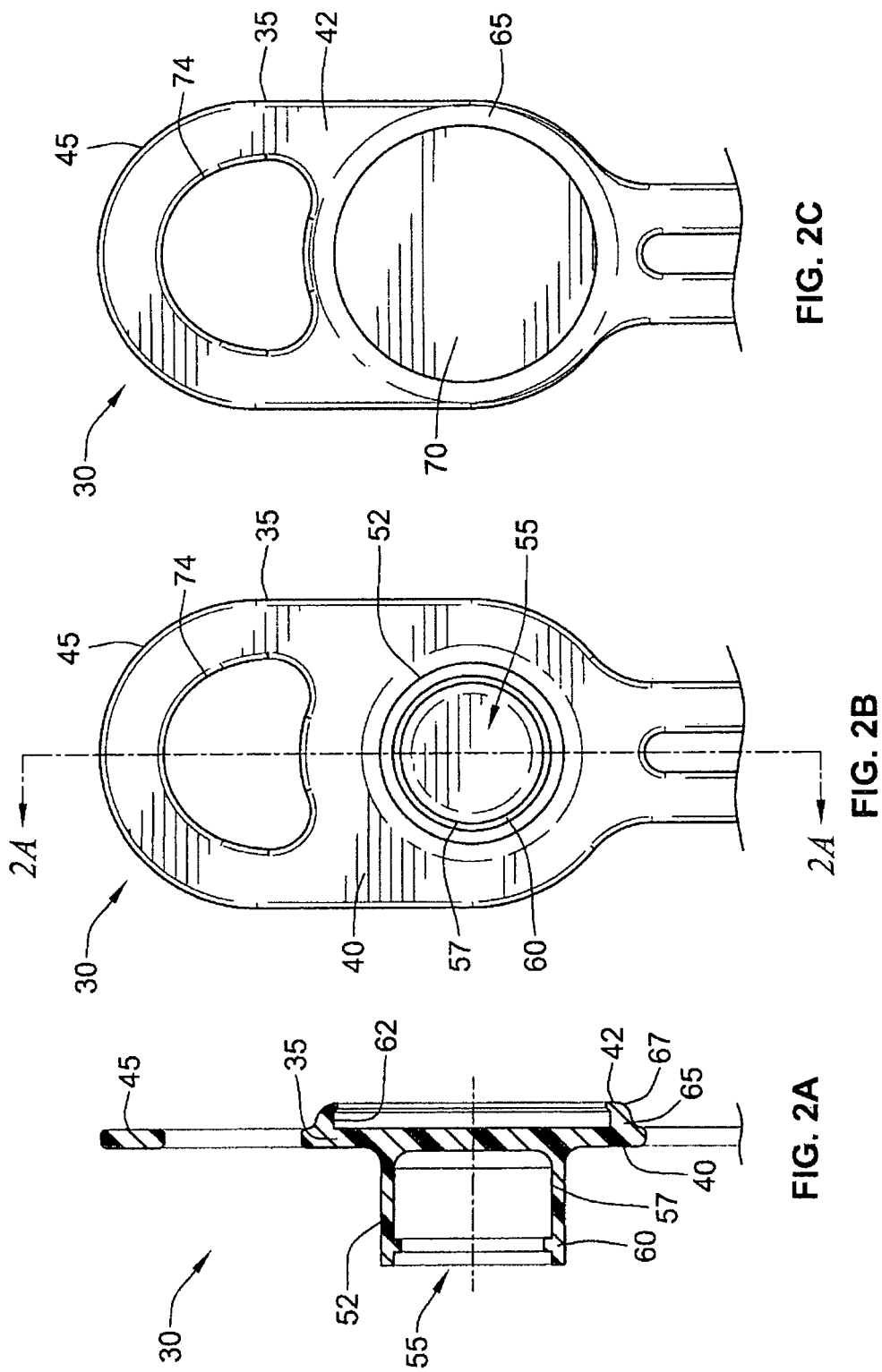

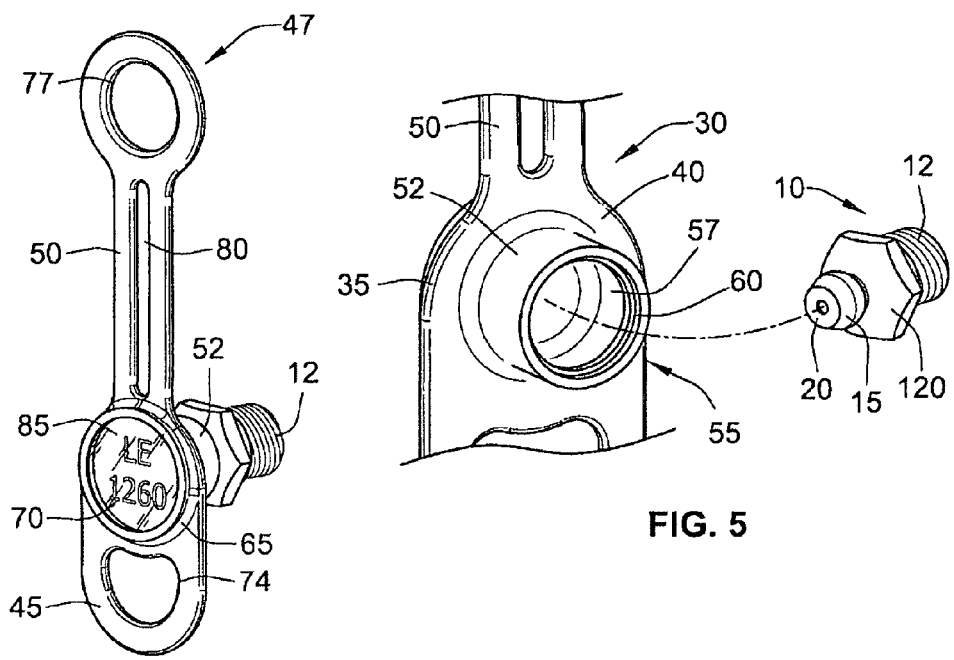
FIG. 5
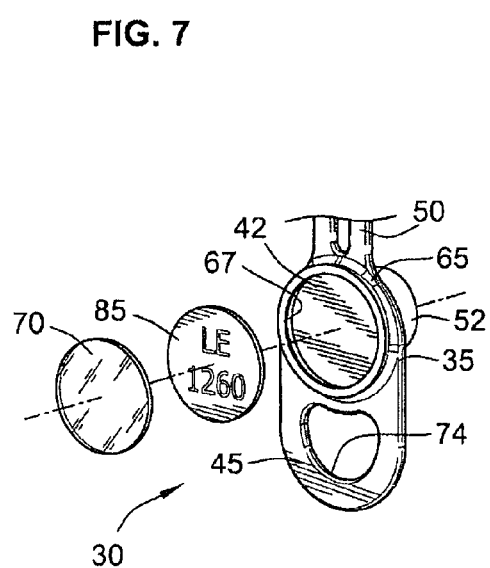
FIG. 7
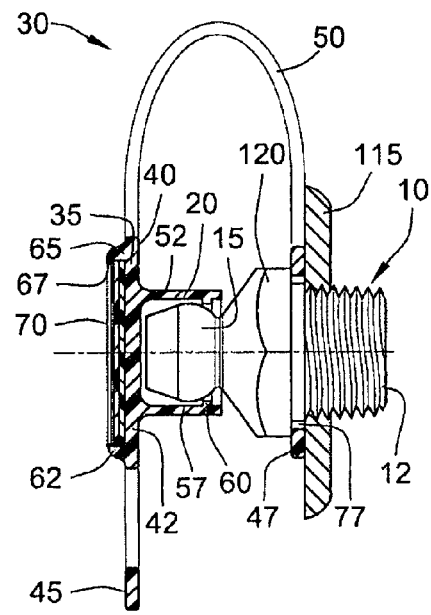
FIG. 6
FIG. 4

US 8,434,597 B2

FITTING COVER

FIELD OF INVENTION

The present invention generally relates to a protective cap for fittings. More specifically, the present invention relates to an improved protective cap for a lubricant fitting.

BACKGROUND OF THE INVENTION

Generally, machinery is provided with lubricant fittings such as a nipple or zerk to apply internal lubrication. The fittings allow lubricants, such as grease, to be injected under pressure into the machine, while preventing such lubricant from leaking outwardly therefrom. As shown in FIG. 1, a typical lubricant fitting 10 has a wrenching surface 120 and a threaded end 12 for securing to a port of a machine. The opposite end of the fitting 10 generally includes a head 15 having a neck 17 and lubricant introduction port 20 with a check valve (not shown). To apply lubrication, a grease gun may be secured to the head 15 to inject the lubrication into the port 20 with sufficient force to overcome the check valve and the internal pressure of the machine.

Often, such fittings are positioned in places that are difficult to locate and are exposed to conditions and foreign materials that may damage the fittings or the machinery that uses the fittings. For example, dust or other abrasive material may settle on the fitting so that when a grease gun is placed over the fitting, the dust is forced into the machine along with the new grease. Under such conditions, equipment failure may result.

Therefore, maintenance personnel consume substantial time locating fittings hidden by dust and dirt, and additional time cleaning the grease fittings before the grease gun is attached. Even when the fittings are clean, operators or maintenance personnel occasionally inject a different lubrication than required. An incorrect lubricant can result in catastrophic machine failure.

In an attempt to overcome these problems, protective covers have been used on lubricant fittings. However, such covers suffer a variety of deficiencies. Typically, the covers are small and difficult to locate, especially when covered in dust or when installed in poorly lit areas. Therefore, covers have been provided in different colors to help locate the underlying fittings. However, the covers are only available in a limited range of colors and usually fade. In addition, the covers do not provide adequate grip for removing the covers from the fittings, making it difficult to inject new lubricants into the machine.

In addition, the covers are designed primarily to protect lubricant fittings from contamination or damage. Typically, the covers provide no indication of the correct lubricant to inject into the machine. Therefore, a need exists for an improved lubricant fitting cover.

BRIEF DESCRIPTION OF THE SEVERAL VIEWS OF THE DRAWING

Objects and advantages together with the operation of the invention may be better understood by reference to the following detailed description taken in connection with the following illustrations, wherein:

FIG. 2A is a cross-sectional side view of a cover in an embodiment of the present invention;
FIG. 2B is a frontal view of the cover of FIG. 2A;
FIG. 2C illustrates a rear view of a the cover of FIG. 2A;

FIG. 4 is a partial cross-sectional view of the cover in an embodiment of the present invention;
FIG. 5 is a partial perspective view of the cover and a fitting in an embodiment of the present invention;
FIG. 6 is a partial exploded view of the cover in an embodiment of the present invention;
FIG. 7 is a perspective view of the cover installed on a fitting in an embodiment of the present invention.

DETAILED DESCRIPTION OF THE INVENTION

While the invention is described with reference to lubricant fittings, it should be clear that the invention should not be limited to such uses or embodiments. The description herein is merely illustrative of an embodiment of the invention and in no way should limit the scope of the invention.

Figure 1:
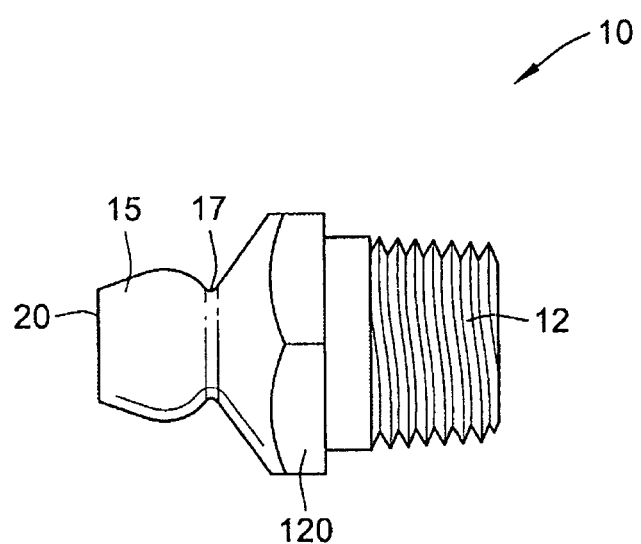
FIG. 1 is a perspective view of a typical lubricant fitting.
Figure 3C:
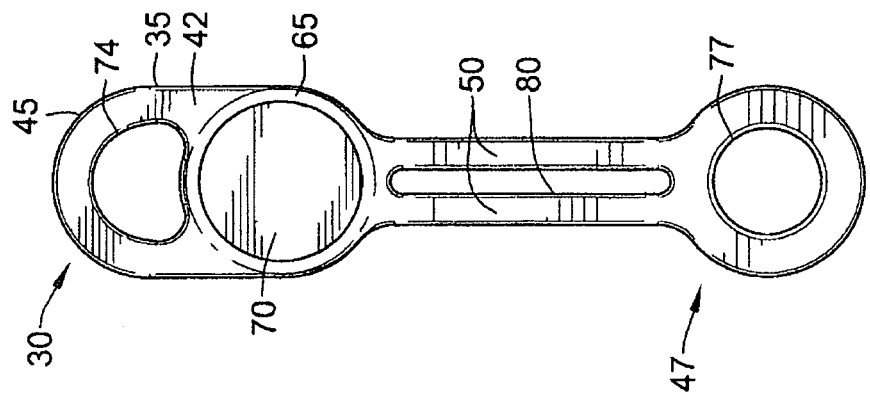
FIG. 3C illustrates a rear view of the cover of FIG. 3A.
Figure 3B:
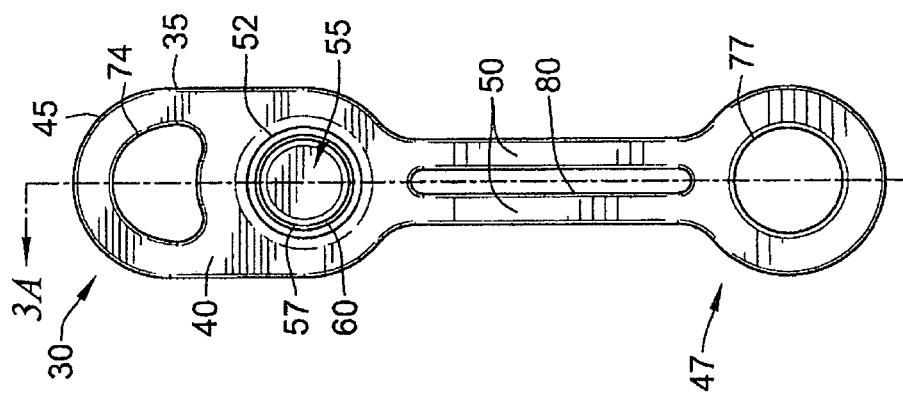
FIG. 3B is a frontal view of the cover of FIG. 3A.
Figure 3A:
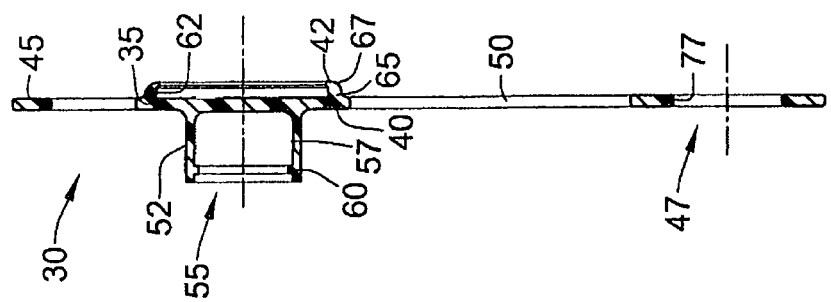
FIG. 3A is a cross-sectional side view of a cover in an embodiment of the present invention.

Reference will now be made to an embodiment of the invention as illustrated in accompanying FIGS. 2-9. As shown in FIG. 2A, a cover 30 is provided having a body 35 with a first side 40 and a second side 42. The first side 40 is capable of being removeably secured to the head 15 of a fitting 10. The second side 42 includes an indicator 85 providing information, such as, the type of lubricant to be injected through the fitting 10. As shown in FIGS. 3A, 3B, and 3C, the cover 30 may have a grip 45, a retaining member 47, and legs 50.

As shown in FIGS. 2A and 2B, the body 35 may be substantially planar and may be made from a variety of materials including, but not limited to, metals, plastics, rubber, and combinations thereof. In one illustrative example, the body 35 is made from polyethylene.

As best shown in FIG. 2A, the first side 40 is provided with an engagement member 52 capable of removeably securing the cover 30 about the head 15 of the fitting 10. The engagement member 52 may extend substantially perpendicularly outward from the first side 40 and may terminate at an open end 55. An inner wall 57 of the engagement member 52 defines a cavity therein for inserting the head 15, as shown in FIG. 4. The inner wall 57 provides a seal around the head 15 to prevent dust, moisture, and other foreign matter from contacting the head 15 or port 20. Although the engagement member 52 is shown as having a cylindrical shape, one of ordinary skill in the art will appreciate that other shapes may be used to accommodate any type of head 15.

As shown in FIGS. 2A and 5, the engagement member 52 may also be provided with one or more protrusions 60 extending from the inner wall 57. As best shown in FIG. 4, when the engagement member 52 is positioned about the head 15, the protrusion 60 prevents accidental removal of the cover 30. Although the protrusion 60 is shown as having a ring shape, one of ordinary skill in the art will appreciate that the protrusion may include, but is not limited to, one or more rings, o-rings, bumps, barbs, and combinations thereof.

As shown in FIG. 6, a recess is provided on or adjacent to the second side 42 for providing an indicator 85. As shown in FIGS. 2A and 2C, the recess may be defined by the inner surface 62 of a wall 65 extending from the second side 42. Although the wall 65 and resulting recess may be circular in shape, it is to be understood that a variety of shapes may be utilized to accommodate the indicator 85.

The indicator 85 may include, but is not limited to, a label, an engraving, an insert such as a card, sticker, or other interchangeable unit. The indicator 85 may include a variety of indicia such as text, numbers, colors, symbols, and combinations thereof. It is to be understood that such indicia may indicate unique information. Non-limiting examples include information regarding the fitting 10, the type of lubricant to inject, information regarding the machine to be lubricated, maintenance procedures, lubrication schedules or intervals, and combinations thereof.

One or more fingers 67 may be provided for securing the indicator 85 in the recess. In an embodiment, the indicator 85 may be removeably secured in the recess to allow insertion of new or different indicators 85 on the cover 30. Such flexibility allows the cover 30 to be used on different fittings, or updated to reflect changes in lubrication procedures. Although the indicator 85 is described as being secured by fingers 67, one of ordinary skill in the art will appreciate a variety of mechanisms may be used to secure the indicator 85 to the second side 42. In one non-limiting example, the mechanism securing the indicator 85 may be locked to prevent unauthorized personnel from changing the indicator 85.

A best shown in FIGS. 6 and 7, a protective member 70 may be positioned over the indicator 85 to protect the underlying indicator 85 from damage and to keep it weatherproof. In an embodiment, the protective member 70 is a transparent or translucent material. Accordingly, any dust or other foreign material in the surrounding environment will accumulate on the protective member 70 and not the indicator 85. Such material can be wiped away to reveal any instructions without damaging the indicator 85.

The protective member 70 may be made from a variety of materials including, but not limited to, glass, metal, plastic, and combinations thereof. In an embodiment, the protective member 70 may be removeably secured to the second side 42 to allow replacement of the indicator 85 or the protective member 70. Although shown as positioned between fingers 67, a variety of mechanisms may be used for securing the protective member 70. In a non-limiting example, the protective member 70 may be hingedly secured to the body 35 to provide access to the underlying indicator 85. It is understood that in such an example, the protective member 70 may be opaque.

A grip 45 may be provided for removing the cover 30 from the head 15. In one embodiment, as shown in FIG. 3B, the grip 45 may be a loop extending from at least one end of the body 35. The grip 45 may enable additional indicators 85 or devices to be tied or otherwise secured to the cover 30 via aperture 74.

Figure 8:
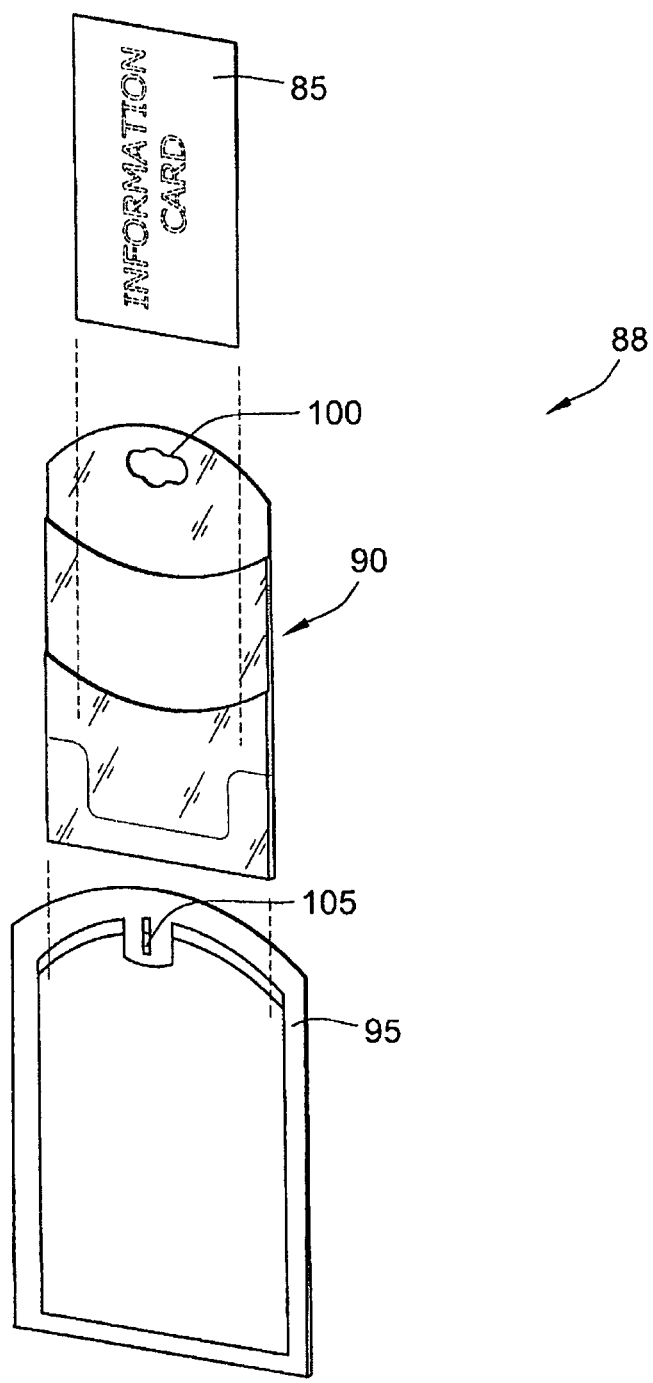
FIG. 8 is an exploded view of a tag.
Figure 9:
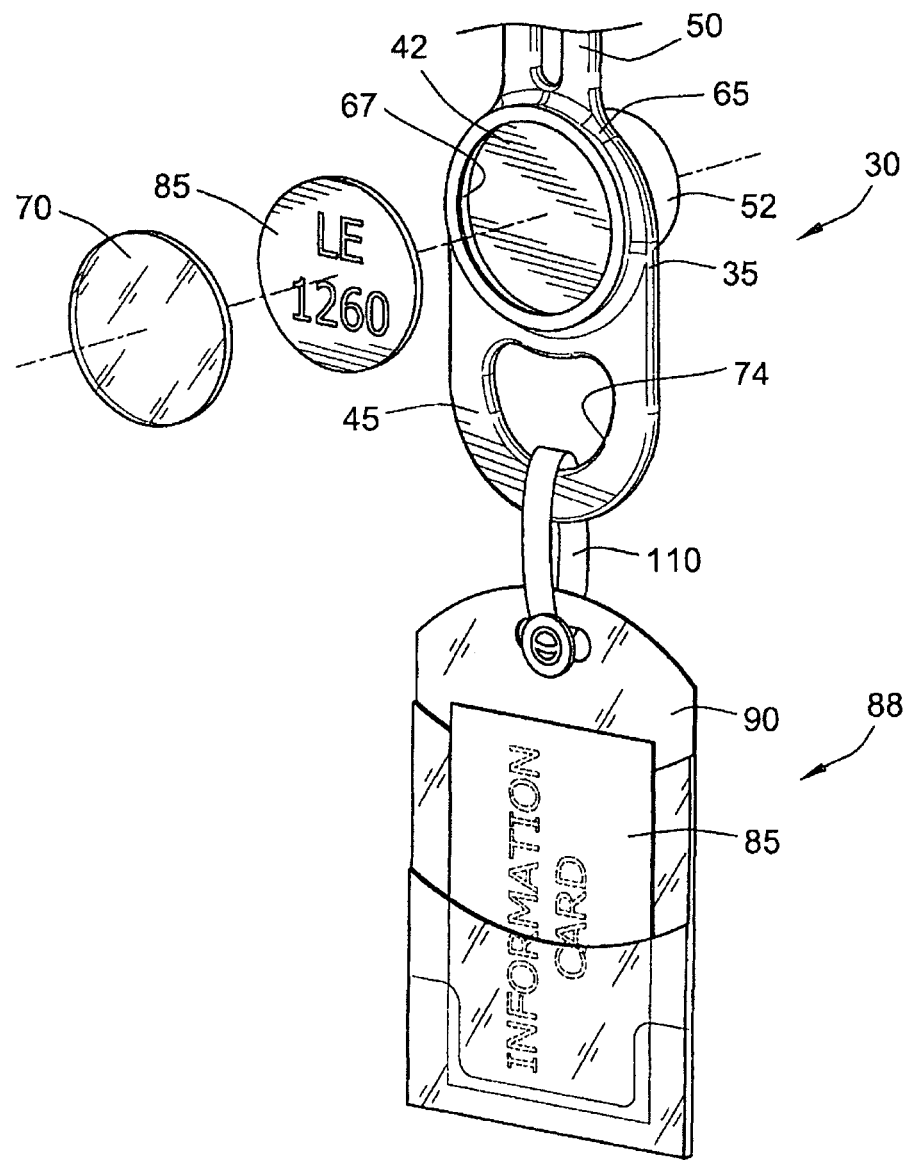
FIG. 9 is a perspective view of a tag secured to the cover in an embodiment of the present invention.

In a non-limiting example, a tag 88 may be secured to the grip 45. As shown in FIG. 8, the tag 88 may include an indicator 85 (such as a card), a holder 90, and a frame 95. Such tags are described in U.S. patent application Ser. No. 11/801,821 entitled "Labeling System," which is hereby incorporated by reference in its entirety. The indicator 85 may be inserted into the holder 90, which in turn may be inserted into the frame 95. It is understood that the holder 90 may be transparent to allow viewing of the indicator 85. The holder may be sealed or otherwise closed to protect the indicator 85 from dirt, moisture, and other foreign materials. As shown in FIG. 9, a cord 110 may be inserted through aperture 100 to attach the tag 88 to the cover 30 via aperture 74 (frame 95 not shown).

As further shown in FIG. 3B, a retaining member 47 may be provided for securing the cover 30 to the fitting 10 while the cover 30 is disengaged from the head 15. The retaining member 47 is provided with an aperture 77 for inserting the threaded end 12 therethrough, as shown in FIG. 4. The fitting 10 may then be threaded so that at least part of the retaining member 47 is interposed or sandwiched between the wrenching surface 120 and the surface of a machine 115 or other device. Accordingly, the cover 30 is secured to the fitting 10 and personnel are able to use both hands to inject lubricant into the fitting 10 while the cover 30 is disengaged from the head 15. It is understood that the retaining member 47 may be made from any suitable material including, but not limited to, metal, plastic, rubber, and combinations thereof.

In one non-limiting example, the aperture 77 has a smaller diameter than the threaded end 12. In such an embodiment, the threaded end 12 may be inserted through the aperture 77, and the retaining member 47 may grip the threaded end 12 to prevent accidental removal from the fitting 10 while threadingly securing the fitting 10 in a machine 115.

As shown in FIG. 3A, the retaining member 47 may be connected to the body 35 with one or more legs 50. As shown in FIG. 4, the legs 50 may operate as a living hinge so that while the retaining member 47 is secured about the neck 17, the engagement member 52 may be positioned about the head 15. In one embodiment, one or more apertures 80 may be provided in or between the legs 50 for attaching indicators 85 or other devices, such as the tag 88. In one illustrative example, an indicator 85 may be tied to the legs 50 via the aperture 80.

It is to be understood, however, that the cover 30 should not be deemed as limited to the legs 50 as shown in FIGS. 3A, 3B, and 3C. One of ordinary skill in the art will appreciate that a variety of different mechanisms may be used to connect the retaining member 47 to the body 35. Illustrative examples include, but are not limited to, strings, cords, and chains. In such examples, a cord may be secured directly about the fitting 10 without the retaining member 47.

It is to be understood that the entire cover 30, or any part thereof, may be provided in a variety of colors. In an illustrative example, the cover 30 may be color-coded to aide a user in identifying and locating the fitting 10. In addition, color-coding may be used to indicate the type of lubricant to inject in that particular lubricant fitting. Further, color-coding may be used to identify which fittings 10 to lubricate in accordance with a maintenance schedule.

Turning to the cover 30, an example of how to use the cover 30 as illustrated in FIGS. 2 through 9 is set forth below. To secure the cover 30 to the fitting 10, the cover 30 may be positioned along a fitting 10 so that the threaded end 12 substantially coaxially aligns with the aperture 77 of the retaining member 47. The threaded end 12 may be inserted through the aperture 77 so that the retaining member 47 is positioned about the threaded end 12. The threaded end 12 may then be threadingly secured to the machine 115. As shown in FIG. 4, at least part of the retaining member 47 is secured between the wrenching surface 120 and the surface of the machine 115.

To cover the head 15, the head 15 may be substantially coaxially aligned with the open end 55 of the engagement member 52. Force may be exerted on the cover 30 toward the fitting 10 so that the head 15 is received within the engagement member 52, as shown in FIG. 4. Accordingly, the body 35 protects the port 20, and the engagement member 52 protects the head 15.

To remove the cover 30 from the head 15, a user may grasp the fitting 10 at the grip 45 to remove the fitting 10 from the cover 30. Once removed from the head 15, the cover 30 remains secured to the fitting 10 via the retaining member 47. Therefore, lubricant may be easily injected without having to handle the cover 30. The cover 30 may then be secured to the head 15 as described above.

Therefore, the cover 30 protects the head 15 of the fitting 10 from damage and/or contamination so that the fitting 10 remains in an operable condition. In addition, the indicator 85 ensures that any necessary information, such as the correct type of lubricant to inject into the machine, is readily available and in good condition.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A Zerk fitting cover adapted and configured to be attached to a Zerk fitting having a bulbous head, a threaded end, and a wrenching surface, the Zerk fitting cover comprising:
    a retaining portion comprising an aperture that is configured and adapted to allow the threaded end of such a Zerk fitting to extend therethrough, the aperture being too small to allow the wrenching surface of such a Zerk fitting to pass therethrough;
    a body portion hingedly attached to the retaining portion with a leg portion, the body portion having a generally planar portion with opposite first and second sides, the body portion first planar side comprising an engagement portion extending therefrom that is configured and adapted to be removably securable to the bulbous head of such a Zerk fitting, the body portion second planar side comprising a recess; and
    an indicator member comprising indicia, the indicator member being secured to the body portion in the recess via interlocking geometry, the indicia being visible when the indicator member is secured to the body portion in the recess.

2. A Zerk fitting cover in accordance with claim 1 further comprising a protective member, the protective member being transparent and secured to the body portion via interlocking geometry adjacent to the recess, the indicia of the indicator member being visible through the protective member when the indicator member and the protective member are secured to the body portion.

3. A Zerk fitting cover in accordance with claim 1 wherein the body portion comprises a grip extending from the body portion planar portion in a direction generally opposite the leg portion, the grip comprising a loop that is configured and adapted to remove the engagement portion from the bulbous head of such a Zerk fitting when pulled.

4. A Zerk fitting cover in accordance with claim 3 further comprising a protective member, the protective member being transparent and secured to the body portion via interlocking geometry adjacent to the recess, the indicia of the indicator member being visible through the protective member when the indicator member and the protective member are secured to the body portion.

5. A Zerk fitting cover in accordance with claim 3 wherein the loop is in a plane generally parallel to the body portion planar portion.

6. A Zerk fitting cover in accordance with claim 1 wherein the leg portion comprising at least two leg members with a slot therebetween.

* * * * *